April 21, 1936.  J. S. COOMBS  2,038,478

COMBINATION CLOTHESLINE REEL AND PIN HOLDER

Filed Aug. 5, 1935  2 Sheets-Sheet 1

Inventor:-
Joseph S. Coombs
by his Attorneys
Howson & Howson

April 21, 1936. J. S. COOMBS 2,038,478
COMBINATION CLOTHESLINE REEL AND PIN HOLDER
Filed Aug. 5, 1935  2 Sheets-Sheet 2
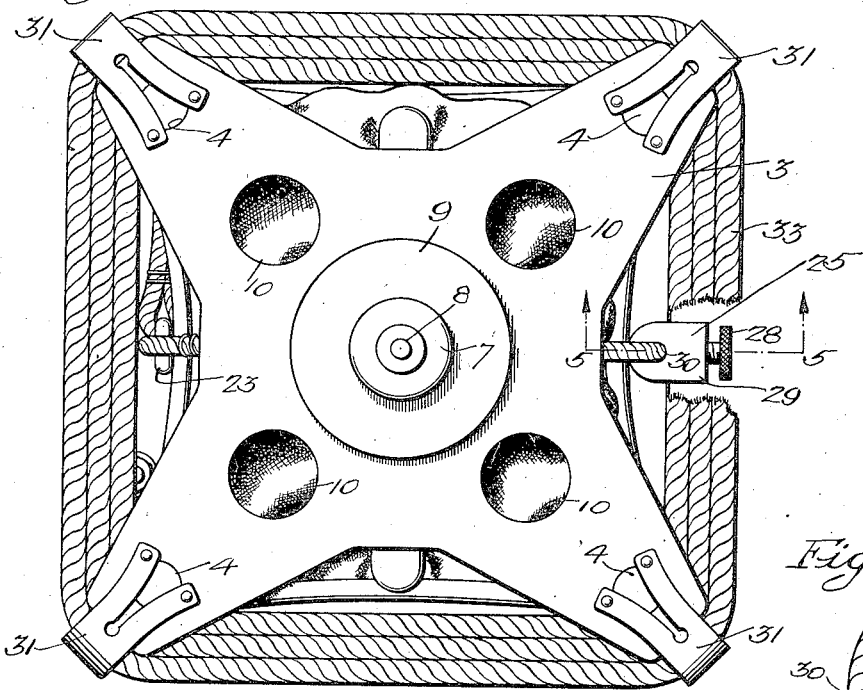
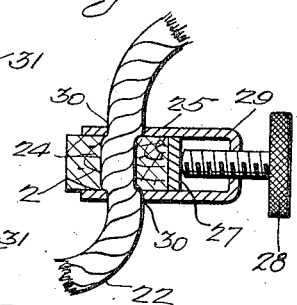
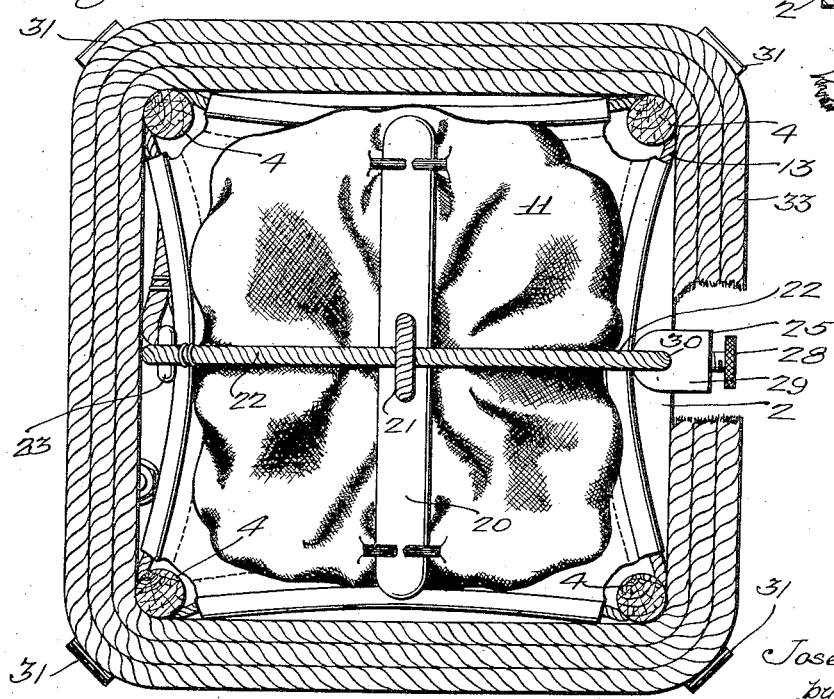
Inventor:—
Joseph S. Coombs
by his Attorneys
Howson & Howson Patented Apr. 21, 1936

2,038,478

UNITED STATES PATENT OFFICE 2,038,478

COMBINATION CLOTHES-LINE REEL AND PIN HOLDER

Joseph S. Coombs, Bridgeton, N. J.

Application August 5, 1935, Serial No. 34,816

12 Claims. (Cl. 68—3)

This invention relates to a combination clothes-line reel and clothes-pin holder, the principal object of the invention being to provide a novel device of this nature having the several desirable features set forth hereinafter.

Another object of the invention is to provide a device of this nature which may be economically constructed and which is light in weight and efficient and convenient to use.

The invention may be fully understood by reference to the accompanying drawings wherein there is illustrated a preferred form of the device.

In the drawings:

Fig. 3 is a face view of the opposite side of the device;

Fig. 4 is a sectional view taken along line 4—4 of Fig. 2; and

Fig. 5 is a fragmentary sectional view taken along line 5—5 of Fig. 3.

Referring to the several views of the drawings, the device comprises a frame 1 which is preferably formed of light-weight material, such as wood. The frame 1 comprises opposed sides 2 and 3 and transverse pins 4 connecting the sides together, thus forming a reel. These members are preferably constructed of wood. The sides 2 and 3 may be formed of ply wood, while the pins 4 may consist of wooden pins having their ends inserted in openings of the sides and attached by glue or in any other suitable manner. The frame constituting the reel is preferably square in shape, the side members preferably taking the respective forms illustrated.

Figure 1:
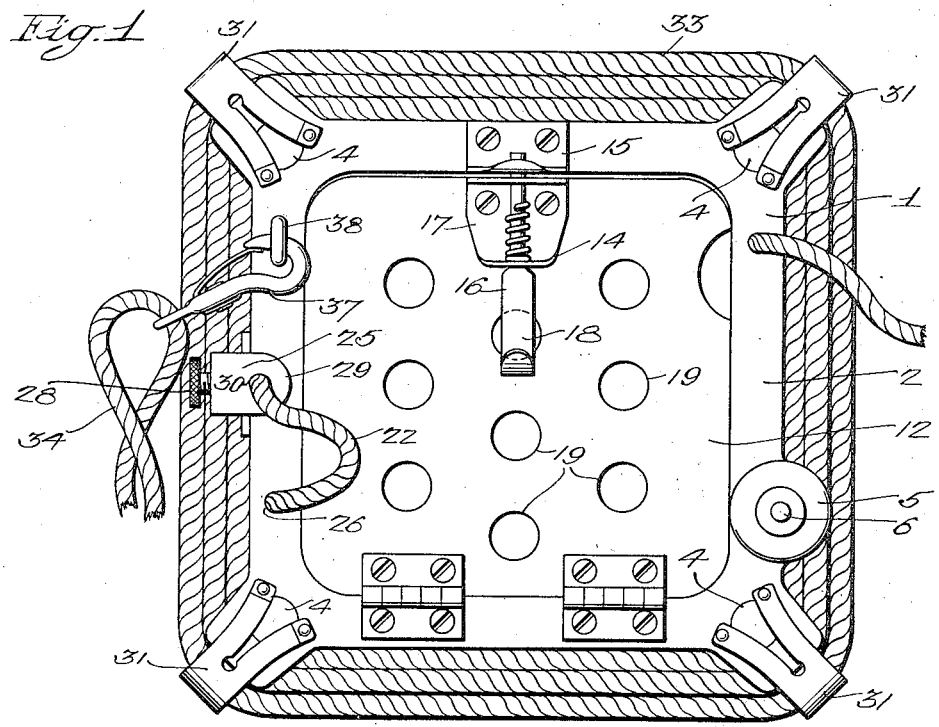
Fig. 1 is a face view of one side of the device.
Figure 2:
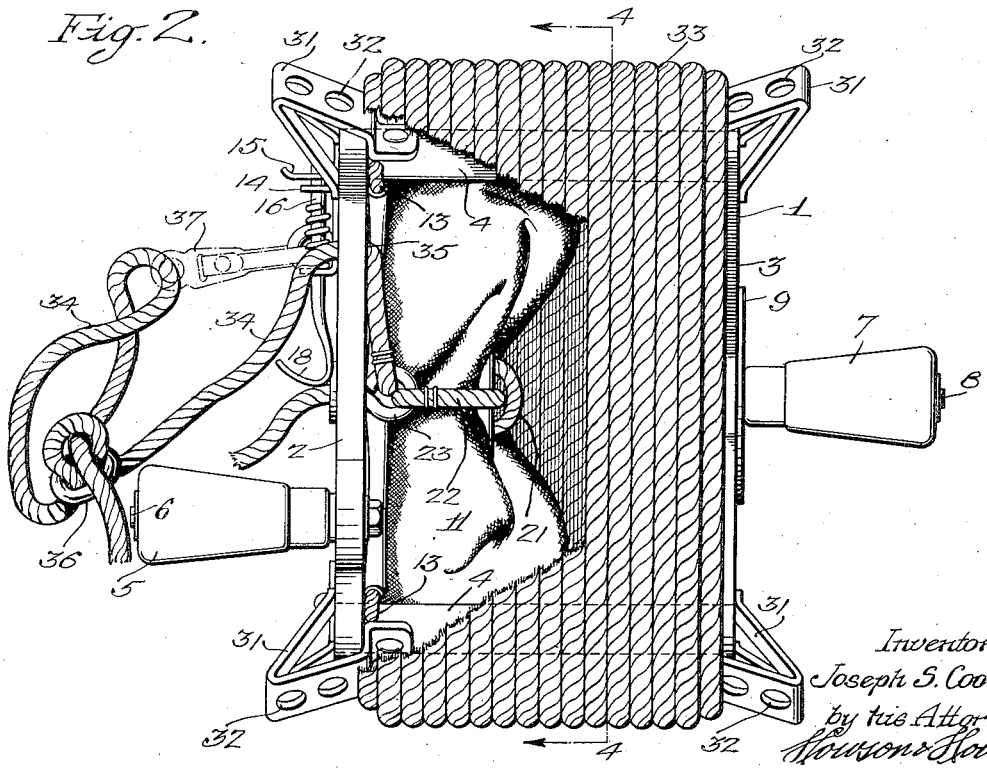
Fig. 2 is an elevational view looking at the device from the right side of Fig. 1, the wound clothes-line being broken away for the sake of illustration.

On the side 2 of the frame, there is provided an extending handle 5 which is preferably formed of wood and is rotatably mounted upon a metal pin 6 secured to the side 2, as clearly illustrated in Fig. 2. The handle 5 is offset from the axis of the frame, as shown clearly in Fig. 1. On the opposite side 3 of the frame, there is provided a similar handle 7 which is centrally or axially located on the frame. This handle is also rotatably mounted on a metal pin 8 secured to the side 3. A washer 9 which may be formed of fiber or other suitable material is rotatably mounted upon the pin 8 between the handle 7 and the side 3. This washer serves as brake for the reel which may be applied during use of the device, and it also serves as a bearing member for the hand of the user.

In order to reduce the weight of the device, the side 3 of the frame is formed as illustrated clearly in Fig. 3 and is provided with openings 10 which serve to materially reduce the weight. The side 2 is formed as illustrated in Fig. 1 for a purpose which will be apparent later.

A clothes-pin sack 11, which may be formed of any suitable fabric or cloth, is mounted within the frame adjacent the side 2 and there is mounted on the side 2 a hinged closure member or door 12 for the pin sack, the sack being mounted with its open side adjacent the inner side of the door. To this end, the open side of the sack may be secured to the pins 4 by a cord 13 attached to the edge of the sack and passing through apertures in the pins, as shown in Figs. 2 and 4. The door 12 is normally secured in closed position by the latch 14, which comprises a keeper 15 mounted upon the side 2 and a spring-pressed latch element or pin 16 slidably carried by a bracket 17 on the door, the free end of the latching member being formed to provide an actuating handle 18. The door may be formed of any suitable material such as fiber or wood and it is provided with apertures 19 which serve to reduce the weight of the device and also serve to ventilate the interior of the sack, thus facilitating the drying of wet clothes pins which may be placed in the sack.

A bar 20, which may be formed of wood, is secured to the rear side of the pin sack, as shown in Figs. 2 and 4, and there is provided on this bar a cord eyelet 21, through which a cord 22 passes. The cord 22 is secured at one end to a metal eyelet 23 (see Fig. 2) which eyelet is carried upon the side 2 of the frame. The cord 22 passes around the sack and through an opening 24 in the side 2 and a retaining device 25 associated therewith (see Fig. 5). The opposite end of the cord 22 may be secured to the frame side 2, as indicated at 26 in Fig. 1, the end of the cord passing through an aperture in the side 2 and being knotted.

Referring to Fig. 5, the retaining device 25 comprises a short metal bar 27 against which the end of thumb screw 28 abuts. This thumb screw is threadedly carried by a yoke 29 having apertures 30 in its sides through which the cord 22 passes. It will be seen that tightening of the screw 28 will cause the yoke 29 to move toward the right as viewed in Fig. 5, thus securing the cord 22 in an obvious manner.

It will now be seen that after the clothes pins have been placed in the sack 11, the cord 22 may be tightened to collapse the sack toward the door 12 by pulling the cord tight and then tightening the screw 28 of the retaining device 25. In this manner, the clothes pins within the sack 11 are confined in a small space and are prevented from moving around within the sack during winding of the clothes-line upon the reel.

In further accordance with the invention, there is provided at each corner of the frame 1 a reinforcing extension member 31. These members are preferably formed of light-weight metal, such as aluminum, and they are provided with apertures 32 to reduce their weight to a minimum. At one end, each of the members 31 is bifurcated and attached to side 2 by means of small pins, as shown clearly in Fig. 1, the opposite end of each member being secured to the associated wooden pin 4, as shown in Fig. 2. These reinforcing members are shaped as illustrated in Fig. 2 so that they pass around the corners of the device and extend diagonally outward. These members strengthen the reel at the wooden pins and they also provide an extension of the reel so that a greater amount of clothes-line may be wound on the device than would be possible otherwise, as clearly illustrated in the drawings, the wound clothes-line being clearly shown at 33.

There is also provided on the device suspension means which preferably comprises a cord 34 having one end passed through the side 2, as at 35 and secured to the eyelet 23, as shown clearly in Fig. 2. Cord 35 is looped through a small ring 36 and passes through a clasp 37, the end of the cord being brought back through the looped portion at the ring 36. The clasp 37 is adapted for attachment to an eyelet 38 on the outside of the side 2. The ring 36 and the arrangement and particular association of the cord 35 therewith enables adjustment of the length of the cord 35. By means of this cord, the device may be suspended from a support or it may be suspended upon a clothes-line and may be slid therealong as the clothes pins are being used or placed in the sack. The adjustable cord 35 also enables a user to fasten the device around his waist so that the device serves as sort of a basket for the clothes pins being used.

In using the device, it will be apparent that a clothes-line may be wound upon the reel by simply grasping the handles 5 and 7 and turning the handles with respect to one another while walking. Since the device is light in weight, it may be readily employed in this manner. The washer 9 may be caused to exert a braking action on the reel, when desired, by simply pressing it against the side of the reel. It will also be seen that the device may be used to hold the clothes pins and in respect to this function, the device has the several desirable features above mentioned.

It will be apparent that there is provided by this invention a simple device which may be economically constructed and which is light in weight and convenient in use. Although a specific preferred form of the device has been illustrated and described for the purpose of disclosure, it will be understood that various changes and modifications may be made, particularly in the details of the device.

I claim:

1. A combination clothes-line reel and pinholder, comprising a frame constituting a reel, a pin sack carried within said frame adjacent a side thereof, and a closure member for said sack on said side of the frame.

2. A combination clothes-line reel and pinholder, comprising a frame constituting a reel, a pin sack carried within said frame adjacent a side thereof, a closure member for said sack on said side of the frame, and means for collapsing said sack toward said closure member to confine the pins in the sack in a relatively small space.

3. A combination clothes-line reel and pinholder, comprising a frame constituting a reel, a rotatable handle mounted on one side of said frame axially thereof, a second rotatable handle mounted on the opposite side of said frame offset from the axis thereof, and a pin-receptacle carried within said frame.

4. A combination clothes-line reel and pinholder, comprising a frame constituting a reel, a rotatable handle mounted on one side of said frame axially thereof, a second rotatable handle mounted on the opposite side of said frame offset from the axis thereof, a pin-receptacle carried within said frame, and a closure member for said receptacle on said opposite side of the frame.

5. A combination clothes-line reel and pinholder, comprising a frame constituting a reel, a rotatable handle mounted on one side of said frame axially thereof, a second rotatable handle mounted on the opposite side of said frame offset from the axis thereof, a pin-receptacle carried within said frame, an apertured hinged door for said receptacle on said opposite side of the frame, and an adjustable suspension member attached to said other side of the frame, whereby the device may be suspended while using said pin receptacle.

6. A combination clothes-line reel and pinholder, comprising a frame constituting a reel, a rotatable handle mounted on one side of said frame axially thereof, a second rotatable handle mounted on the opposite side of said frame offset from the axis thereof, a pin sack carried within said frame adjacent said opposite side thereof, and an apertured hinged door for said sack on said opposite side of the frame.

7. A combination clothes-line reel and pinholder, comprising a frame constituting a reel, a rotatable handle mounted on one side of said frame axially thereof, a second rotatable handle mounted on the opposite side of said frame offset from the axis thereof, a pin sack carried within said frame adjacent said opposite side thereof, an apertured hinged door for said sack on said opposite side of the frame, and means for collapsing said sack toward said door to confine the pins in the sack in a relatively small space.

8. A combination clothes-line reel and pinholder, comprising a frame constituting a reel, a rotatable handle mounted on one side of said frame axially thereof, a second rotatable handle mounted on the opposite side of said frame offset from the axis thereof, a pin sack carried within said frame adjacent said opposite side thereof, an apertured hinged door for said sack on said opposite side of the frame, a flexible member passing behind said sack and adapted to collapse the sack toward said door to confine the pins in the sack in a relatively small space, and means for retaining said member in its sack-collapsing position.

9. A combination clothes-line reel and pinholder, comprising a frame constituting a reel, a rotatable handle mounted on one side of said frame axially thereof, a second rotatable handle mounted on the opposite side of said frame offset from the axis thereof, a pin sack carried within said frame adjacent said opposite side thereof, an apertured hinged door for said sack on said opposite side of the frame, a flexible member passing behind said sack and adapted to collapse the sack toward said door to confine the pins in the sack in a relatively small space, means for retaining said member in its sack-collapsing position, and adjustable suspension means attached to said frame.

10. A clothes-line reel, comprising a frame having opposed sides and transverse members connecting said sides, and reinforcing extension members each comprising a metal bracket having its ends attached respectively to one of said sides and to one of said transverse members, each said bracket extending obliquely outward from said frame so as to increase the area and capacity of the frame.

11. A clothes-line reel, comprising a substantially square wooden frame having opposed sides and transverse pins connecting said sides, and a reinforcing extension member at each corner of said frame, each said member comprising a metal bracket having its ends attached respectively to one of said sides and to one of said pins, each said member passing around a corner of said frame and extending obliquely outward therefrom.

12. A combination clothes-line reel and pin holder, comprising a frame constituting a reel, a rotatable handle mounted on one side of said frame axially thereof, a rotatable washer interposed between said handle and said side adapted to serve as a brake, a pin receptacle carried within said frame, a door for said receptacle on the opposite side of said frame, and a second rotatable handle mounted on said opposite side of said frame adjacent said door and offset from the axis of the frame.

JOSEPH S. COOMBS.